(12) United States Patent
Koshiji et al.

(10) Patent No.: US 11,349,586 B2
(45) Date of Patent: May 31, 2022

(54) TIME STAMPING METHOD, TIME STAMPING APPARATUS AND PROGRAM

(71) Applicant: Nippon Telegraph and Telephone Corporation, Tokyo (JP)

(72) Inventors: Kojun Koshiji, Musashino (JP); Naoki Higo, Musashino (JP); Toshimitsu Tsubaki, Musashino (JP); Masanao Nakano, Musashino (JP); Tatsuya Ishihara, Musashino (JP); Yoshiko Sueda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/734,917

(22) PCT Filed: Apr. 25, 2019

(86) PCT No.: PCT/JP2019/017784
§ 371 (c)(1),
(2) Date: Dec. 3, 2020

(87) PCT Pub. No.: WO2019/235101
PCT Pub. Date: Dec. 12, 2019

(65) Prior Publication Data
US 2021/0234626 A1 Jul. 29, 2021

(30) Foreign Application Priority Data
Jun. 4, 2018 (JP) .............................. JP2018-107151

(51) Int. Cl.
*H04J 3/06* (2006.01)
*H04W 56/00* (2009.01)

(52) U.S. Cl.
CPC .......... *H04J 3/0667* (2013.01); *H04J 3/0682* (2013.01); *H04W 56/004* (2013.01); *H04W 56/0065* (2013.01)

(58) Field of Classification Search
CPC ...... H04J 3/0635; H04J 3/0638; H04J 3/0658; H04J 3/0661; H04J 3/0667; H04J 3/0682;
(Continued)

(56) References Cited

U.S. PATENT DOCUMENTS 6,735,223 B1 * 5/2004 Woo ................... H04L 12/40071
370/516
9,628,288 B2 * 4/2017 Han ......................... H04L 47/32
(Continued)

FOREIGN PATENT DOCUMENTS

| JP | 2013-115824 | 6/2013 |
|---|---|---|
| JP | 2016-201690 | 12/2016 |
| JP | 2017-126864 | 7/2017 |

OTHER PUBLICATIONS

Sawada et al., "Development of a Practical Time Synchronization Method for Wireless Sensor Networks for Acceleration Measurement," Japan Society of Civil Engineers, 2009, 65(1):30-37, 17 pages (with English Translation).
(Continued)

*Primary Examiner* — Kevin D Mew
(74) *Attorney, Agent, or Firm* — Fish & Richardson P.C.

(57) ABSTRACT

A time providing method includes: by a computer, upon receiving data from a device, estimating a generation time of the data using a reception time of the data and a first delay time of the device previously estimated; providing information indicating the generation time to the data; and transmitting the data provided with the information indicating the generation time to a destination of the data.

19 Claims, 7 Drawing Sheets

(58) Field of Classification Search
 CPC ........... H04W 56/004; H04W 56/0065; H04W 56/0075
 See application file for complete search history.

(56) References Cited

U.S. PATENT DOCUMENTS

| | | | |
|---|---|---|---|
| 2013/0170367 A1 | 7/2013 | Jang et al. | |
| 2014/0029603 A1* | 1/2014 | Nomura | H04W 56/0015 370/350 |
| 2014/0032778 A1* | 1/2014 | Sim | H04L 65/80 709/232 |
| 2014/0301513 A1* | 10/2014 | Takahashi | H04J 3/0697 375/354 |
| 2015/0271772 A1* | 9/2015 | Knowles | H04W 56/0065 370/350 |
| 2016/0302165 A1* | 10/2016 | Da | H04W 56/002 |
| 2017/0359611 A1* | 12/2017 | Iguchi | H04N 21/633 |
| 2018/0227626 A1* | 8/2018 | Nakazawa | H04N 21/4385 |
| 2018/0351839 A1* | 12/2018 | Shirasuka | H04L 12/28 |

OTHER PUBLICATIONS

Tsukamoto et al., "Research of Grasping Behavior and Life Circumstance using Wireless Sensor Network," Toyama Prefectural Industrial Technology Center Research Report, 2011, 25:33-34, 6 pages (with English Translation).

* cited by examiner

TIME STAMPING METHOD, TIME STAMPING APPARATUS AND PROGRAM

CROSS-REFERENCE TO RELATED APPLICATIONS

This application is a National Stage application under 35 U.S.C. § 371 of International Application No. PCT/JP2019/017784, having an International Filing Date of Apr. 25, 2019, which claims priority to Japanese Application Serial No. 2018-107151, filed on Jun. 4, 2018. The disclosure of the prior application is considered part of the disclosure of this application, and is incorporated in its entirety into this application.

TECHNICAL FIELD

The present invention relates to a time providing method, a time providing apparatus, and a program.

BACKGROUND ART

In recent years, the development of Internet of Things (IoT) has made it possible to acquire data from various devices through a communication network. However, most of the data is not fully leveraged, and in particular, the combination of data available from a plurality of devices are almost never used. One reason for this is that it is difficult to synchronize the times of data acquired from a plurality of devices with each other.

To address this, various time synchronization techniques have been proposed. These known techniques can be classified into two large approaches. The first approach is to synchronize time information held by devices by causing the devices to communicate with each other before acquiring data (for example, see Non Patent Literature 1). The second approach is to correct the deviation of time information provided to data using the performance and other characteristics of devices (for example, see Non Patent Literature 2).

CITATION LIST

Non Patent Literature

Non Patent Literature 1: Sawada, Shiba, Oguni, "Development of Robust Time Synchronization Method for Wireless Sensor Network". JSCE Journal A1 (Structural and Earthquake Engineering), Vol. 65, No. 1 (JSCE Journal of Earthquake Engineering, vol. 30), 2009.

Non Patent Literature 2: Tsukamoto, Obata, Takamatsu. Asada, "Research of Grasping Behavior and Life Circumstance using Wireless Sensor Network", Reports of the Toyama Industrial Technology Center, No. 25, 2011.

SUMMARY OF THE INVENTION

Technical Problem

For example, sensor devices or the like having a single function/single performance have some constraints including incapability of holding time information, and thus, it may be difficult to employ the first approach described above.

Even if the time information held by individual devices is synchronized using the first approach described above, the devices may fail to hold correct time information. Thus, their time information may be different from the actual time. This also is the case when the second approach described above is used.

To address this, if data transmitted from devices (hereinafter, referred to as "device data") can be provided with time information indicating the time at which the device data was generated, the time of the data acquired from a plurality of devices can be synchronized with each other.

The present invention is made in view of the foregoing, and has an object to provide time information to device data.

Means for Solving the Problem

To achieve the object above, according to an embodiment of the present invention, a time providing method executed by a computer includes: upon receiving data from a device, estimating a generation time of the data using a reception time of the data and a first delay time of the device previously estimated; providing information indicating the generation time to the data; and transmitting the data provided with the information indicating the generation time to a destination of the data.

Effects of the Invention

According to the present invention, time information can be provided to device data.

DESCRIPTION OF EMBODIMENTS

Hereinafter, an embodiment according to the present invention will be described. In the embodiment of the present invention, a time providing system 1 will be described that provides time information indicating a time at which the device data was generated (hereinafter, also referred to as "generation time") to device data. Note that the term "time" is used in the embodiment of the present invention, and the term "time" may include not only hours, minutes, and seconds, but also year, month, and day, for example.

Overall Configuration

Figure 1:
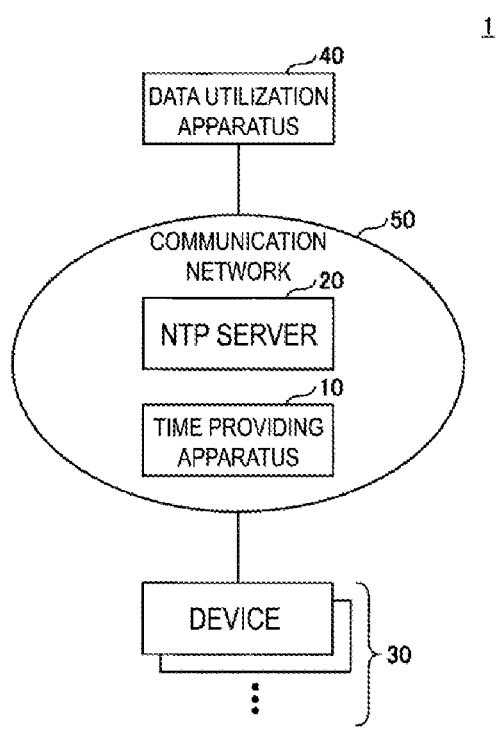
FIG. 1 is a diagram illustrating an example of an overall configuration of a time providing system according to an embodiment of the present invention.

First, an overall configuration of the time providing system 1 according to the embodiment of the present invention will be described with reference to FIG. 1. FIG. 1 illustrates an example of an overall configuration of the time providing system 1 according to the embodiment of the present invention.

As illustrated in FIG. 1, the time providing system 1 according to the embodiment of the present invention includes a time providing apparatus 10, a Network Time Protocol (NTP) server 20, a plurality of devices 30, and at least one data utilization apparatus 40. The devices 30 and the data utilization apparatus 40 are communicably connected via a communication network 50. Note that the communication network 50 is a network supporting the TCP/IP protocol stack, for example.

The time providing apparatus 10 is a computer or a computer system installed in a system environment within the communication network 50 (e.g., a carrier's system environment). The time providing apparatus 10 provides device data transmitted from the devices 30 to the data utilization apparatus 40 via the communication network 50 with time information indicating the generation time of the device data. Note that the generation time is a time at which the device data was generated or created by the devices 30. However, the generation time may be a time at which the device data was transmitted from the devices 30.

The time providing apparatus 10 communicates with the NTP server 20 to correct time information held by itself (i.e., time information of the system clock). Note that the system clock is a clock function managed by an operating system (OS) or the like.

The NTP server 20 is a computer or a computer system installed in a system environment within the communication network 50 (e.g., a carrier's system environment). The NTP server 20 provides accurate time information to the time providing apparatus 10.

The devices 30 area variety of devices that generate device data and transmit them to the data utilization apparatus 40. Examples of the devices 30 include various sensor devices and the like. Note that the devices 30 may be devices capable of communicating via the communication network 50, and may be, for example, home appliances, vehicles, wearable devices, gaming devices, or the like. Furthermore, the devices 30 may have different functions, performance, specifications, or the like.

The data utilization apparatus 40 is a computer or a computer system that utilizes the device data received from the devices 30 for various types of applications. Examples of such applications include analysis of the device data, prediction using the device data, and the like. The data utilization apparatus 40 or the applications provided by the data utilization apparatus 40 are managed by, for example, an operator providing the applications. Note that the data utilization apparatus 40 may provide applications that leverage the device data in a service form such as a cloud service.

Note that the overall configuration of the time providing system 1 illustrated in FIG. 1 is an example, and other configurations may be employed. For example, the NTP server 20 is not necessarily included in the system environment in the communication network 50. For another example, the time providing apparatus 10 and the NTP server 20 may be configured integrally.

Hardware Configuration

Figure 2:
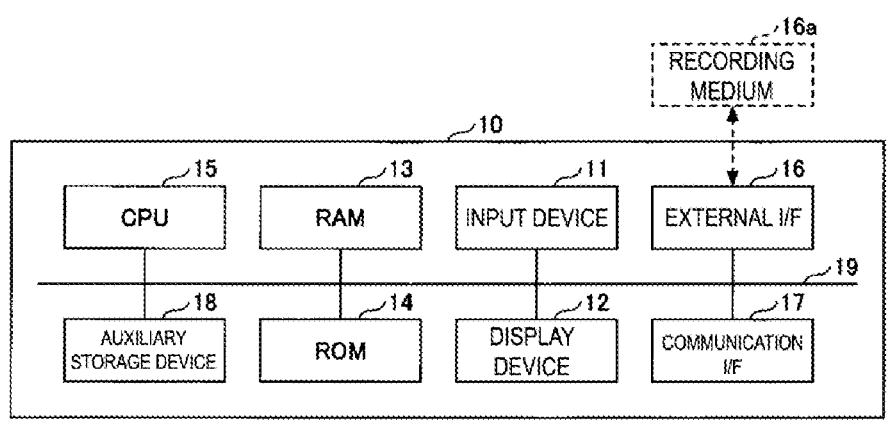
FIG. 2 is a diagram illustrating an example of a hardware configuration of a time providing apparatus according to the embodiment of the present invention.

Next, a hardware configuration of the time providing apparatus 10 according to the embodiment of the present invention will be described with reference to FIG. 2. FIG. 2 illustrates an example of a hardware configuration of the time providing apparatus 10 according to an embodiment of the present invention.

As illustrated in FIG. 2, the time providing apparatus 10 according to the embodiment of the present invention includes an input device 11, a display device 12, a Random Access Memory (RAM) 13, a Read Only Memory (ROM) 14, a Central Processing Unit (CPU) 15, an external I/F 16, a communication I/F 17, and an auxiliary storage device 18. Each of these pieces of hardware is communicably connected via a bus 19.

The input device 11 is, for example, a keyboard, a mouse, a touch panel, and the like, and is used by a user to input various operations. The display device 12 is, for example, a display, and is used to display processing results and the like to the user. Note that the time providing apparatus 10 may not include at least one of the input device 11 and the display device 12.

The RAM 13 is a volatile semiconductor memory that temporarily stores programs and data. The ROM 14 is a non-volatile semiconductor memory that can retain programs and data even when the power is turned off. The CPU 15 is an arithmetic device that reads programs and data from the ROM 14, the auxiliary storage device 18, and the like onto the RAM 13 and performs processing.

The external I/F 16 is an interface with an external apparatus. The external apparatus includes a recording medium 16a and the like. Examples of the recording medium 16a may include a Compact Disc (CD), a Digital Versatile Disk (DVD), a Secure Digital memory card (SD memory card), a Universal Serial Bus (USB) memory card, and the like.

The communication I/F 17 is an interface for the time providing apparatus 10 to perform data communications with other apparatuses (e.g., the NTP server 20, the devices 30, the data utilization apparatus 40, and the like).

The auxiliary storage device 18 is, for example, a Hard Disk Drive (HDD), a Solid State Drive (SSD), or the like, and is a non-volatile storage apparatus that stores programs or data. Examples of the programs and data stored in the auxiliary storage device 18 include, for example, an OS, various types of programs that operate on the OS.

The time providing apparatus 10 according to the embodiment of the present invention has the hardware configuration illustrated in FIG. 2 and thus can perform various processing described below. In the example illustrated in FIG. 2, a case has been described where the time providing apparatus 10 according to the embodiment of the present invention is achieved by one apparatus (computer), but the present invention is not limited to this. The time providing apparatus 10 according to the embodiment of the present invention may be achieved by a plurality of apparatuses (computers).

Procedure of Processing

Figure 3:
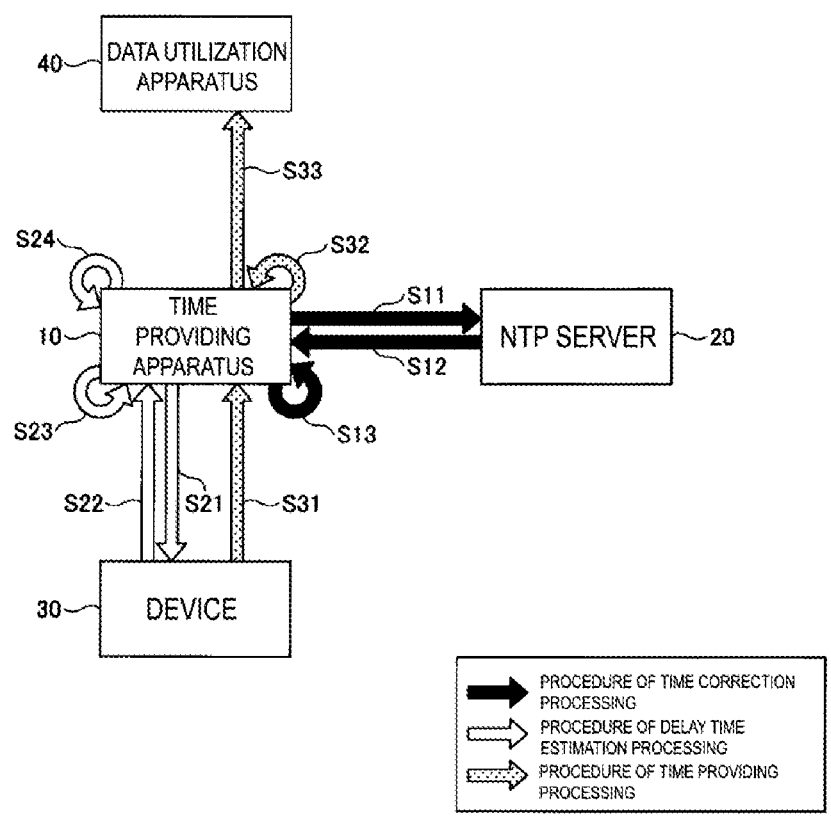
FIG. 3 is a diagram illustrating an example of the procedure of each process executed by the time providing system according to the embodiment of the present invention.

Hereinafter, the procedure of each process executed by the time providing system 1 will be described with reference to FIG. 3. FIG. 3 illustrates an example of the procedure of each process executed by the time providing system 1 according to the embodiment of the present invention.

The time providing system 1 according to the embodiment of the present invention executes. "time correction processing" in which the time information of the time providing apparatus 10 is corrected with the time information of the NTP server 20, "delay time estimation processing" in which a delay time between the devices 30 and the time providing apparatus 10 (the time required to transmit and receive the device data) is calculated, and "time providing processing" in which time information calculated using the delay time is provided to the device data.

In the time correction processing, the time providing apparatus 10 transmits a time correction message to the NTP server 20 (step S11). Note that the time correction message is a message for requesting the NTP server 20 to acquire time information indicating the current time, for example.

Next, the NTP server 20 transmits a response message including the time information to the time providing apparatus 10 in response to the time correction message (step S12).

Then, upon receiving the response message, the time providing apparatus 10 corrects the time information held by itself with the time information included in the response message (step S13). In this way, the time information of the system clock of the time providing apparatus 10 is synchronized with the time information managed by the NTP server 20 (that is, time information indicating the correct time).

In the delay time estimation processing, the time providing apparatus 10 transmits a delay time measurement message to the device 30 (step S21). Note that the delay time measurement message is a predetermined message used to measure a delay time, and is, for example, an echo request packet of an Internet Control Message Protocol (ICMP) and the like.

Next, the device 30 transmits a response message in response to the delay time measurement message (step S22). Next, the time providing apparatus 10 measures the time required for the time providing apparatus 10 to receive the response message to the delay time measurement message after transmitting the delay time measurement message (hereinafter, also referred to as a "measurement delay time") (step S23).

Then, after repeating the above-described steps S21 to S23 a predetermined number of times, the time providing apparatus 10 calculates a delay time (hereinafter, also referred to as an "estimated delay time") from all measurement delay times (step S24). In this way, the estimated delay time of the device data between the time providing apparatus 10 and the device 30 is calculated.

In the time providing processing, the device 30 transmits device data addressed to the data utilization apparatus 40 (step S31). The device data is received by the time providing apparatus 10 installed in the system environment of the carrier in the communication network 50.

Next, upon receiving the device data, the time providing apparatus 10 calculates the generation time of the device data using the estimated delay time, and then provides time information indicating the generation time to the device data (step S32).

Then, the time providing apparatus 10 transmits the device data provided with the time information to the data utilization apparatus 40 (step S33). In this manner, the device data provided with the time information is transmitted to the data utilization apparatus 40.

Functional Configuration

Figure 4:
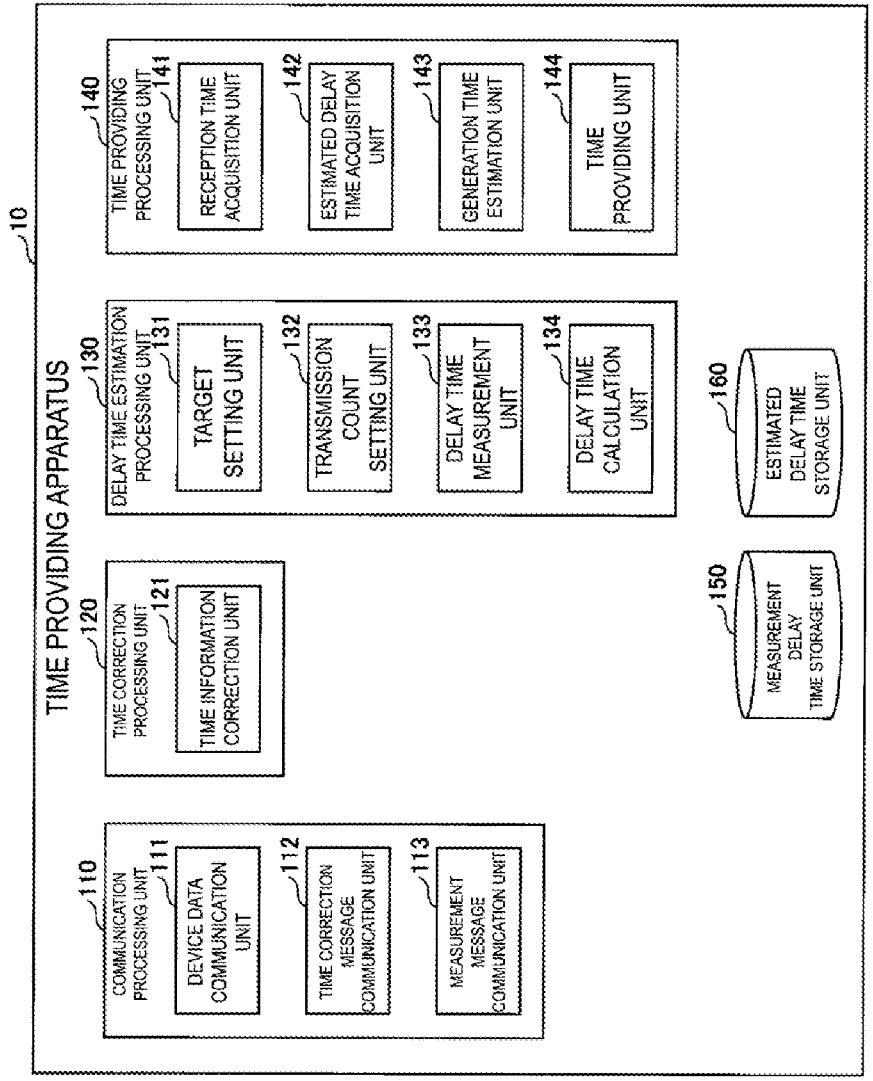
FIG. 4 is a diagram illustrating an example of a functional configuration of the time providing apparatus according to the embodiment of the present invention.

Next, a functional configuration of the time providing apparatus 10 according to the embodiment of the present invention will be described with reference to FIG. 4. FIG. 4 illustrates an example of the functional configuration of the time providing apparatus 10 according to the embodiment of the present invention.

As illustrated in FIG. 4, the time providing apparatus 10 according to the embodiment of the present invention includes a communication processing unit 110, a time correction processing unit 120, a delay time estimation processing unit 130, and a time providing processing unit 140. Each of these processing units is implemented by the CPU 15 executing one or more programs installed on the time providing apparatus 10.

Furthermore, the time providing apparatus 10 according to the embodiment of the present invention includes a measurement delay time storage unit 150 and an estimated delay time storage unit 160. Each of these storage units can be implemented using, for example, the auxiliary storage device 18. Note that at least one of these storage units may be implemented using, for example, a storage apparatus connected to the time providing apparatus 10 via a network.

The communication processing unit 110 executes communication processing for data communications with other apparatuses. Here, the communication processing unit 110 includes a device data communication unit 111, a time correction message communication unit 112, and a measurement message communication unit 113.

The device data communication unit 111 receives device data from the devices 30 and transmits the device data provided with the time information to the data utilization apparatus 40.

The time correction message communication unit 112 transmits the time correction message to the NTP server 20, and receives a response message from the NTP server 20.

The measurement message communication unit 113 transmits the delay time measurement message to the devices 30, and receives a response message from the devices 30.

The time correction processing unit 120 executes time correction processing. Here, the time correction processing unit 120 includes a time information correction unit 121. The time information correction unit 121 corrects time information held by the time providing apparatus 10 (i.e., time information of the system clock) with the time information included in the response message from the NTP server 20.

The delay time estimation processing unit 130 executes delay time estimation processing. Here, the delay time estimation processing unit 130 includes a target setting unit 131, a transmission count setting unit 132, a delay time measurement unit 133, and a delay time calculation unit 134.

The target setting unit 131 sets a device 30 or a set of devices 30 as a target for which an estimated delay time is calculated (calculation target).

The transmission count setting unit 132 sets the number of times (transmission count) N that the delay time measurement message is transmitted to the device 30.

The delay time measurement unit 133 measures the measurement delay time using the delay time measurement message and the response message to this delay time measurement message. The delay time measurement unit 133 stores the measurement delay time in the measurement delay time storage unit 150.

The delay time calculation unit 134 calculates the estimated delay time using N measurement delay times stored in the measurement delay time storage unit 150. The delay time calculation unit 134 stores the estimated delay time in the estimated delay time storage unit 160.

The time providing processing unit 140 executes the time providing process. Here, the time providing processing unit 140 includes a reception time acquisition unit 141, an estimated delay time acquisition unit 142, a generation time estimation unit 143, and a time providing unit 144.

The reception time acquisition unit 141 acquires time information indicating the time at which a device message from the device 30 was received. Note that the time information indicating the time at which the device message was received is acquired from the system clock of the time providing apparatus 10.

The estimated delay time acquisition unit 142 acquires the estimated delay time from the estimated delay time storage unit 160. The generation time estimation unit 143 calculates the generation time of the device message using the reception time and the estimated delay time. The time providing unit 144 provides time information indicating the generation time to the device message.

Note that the functional configuration of the time providing apparatus 10 illustrated in FIG. 3 is an example, and other configurations may be employed. For example, in a case where the time providing apparatus 10 is configured by a plurality of devices (computers), the delay time estimation processing unit 130 and the time providing processing unit 140 may be included in different devices.

Time Correction Processing

Figure 5:
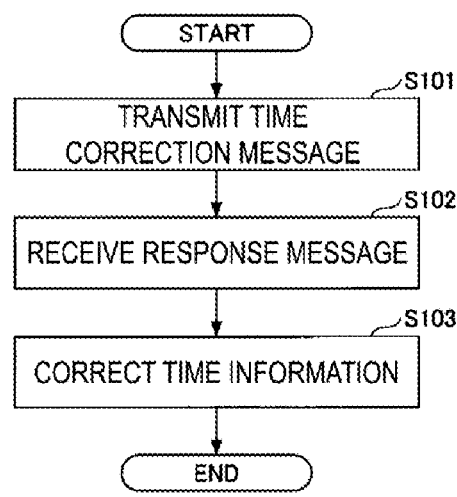
FIG. 5 is a flowchart illustrating an example of time correction processing according to the embodiment of the present invention.

Hereinafter, time correction processing according to the embodiment of the present invention will be described with reference to FIG. 5. FIG. 5 is a flowchart illustrating an example of the time correction processing according to the embodiment of the present invention. The time correction processing described below is repeatedly executed, for example, every prescribed predetermined time period.

Step S101: The time correction message communication unit 112 of the communication processing unit 110 transmits the time correction message to the NTP server 20. In response to this, the NTP server 20 having received the time correction message transmits a response message to the time correction message.

Step S102: The time correction message communication unit 112 of the communication processing unit 110 receives the response message to the time correction message described above. Note that the response message includes time information held by the NTP server 20.

Step S103: The time information correction unit 121 of the time correction processing unit 120 corrects the time information held by the time providing apparatus 10 with the time information included in the response message. In this way, the time information held by the time providing apparatus 10 is synchronized with the time information managed by the NTP server 20 (that is, time information indicating the correct time). Note that the time information correction unit 121 corrects the time information held by the time providing apparatus 10 with the time information included in the response message, in consideration of the time required for transmitting and receiving data between the time providing apparatus 10 and the NTP server 20 (i.e., a round-trip delay time).

As described above, the time providing apparatus 10 according to the embodiment of the present invention synchronizes the time information with the NTP server 20 every predetermined time period. As a result, the time providing apparatus 10 according to the embodiment of the present invention can maintain accurate time information.

Delay Time Estimation Processing

Figure 6:
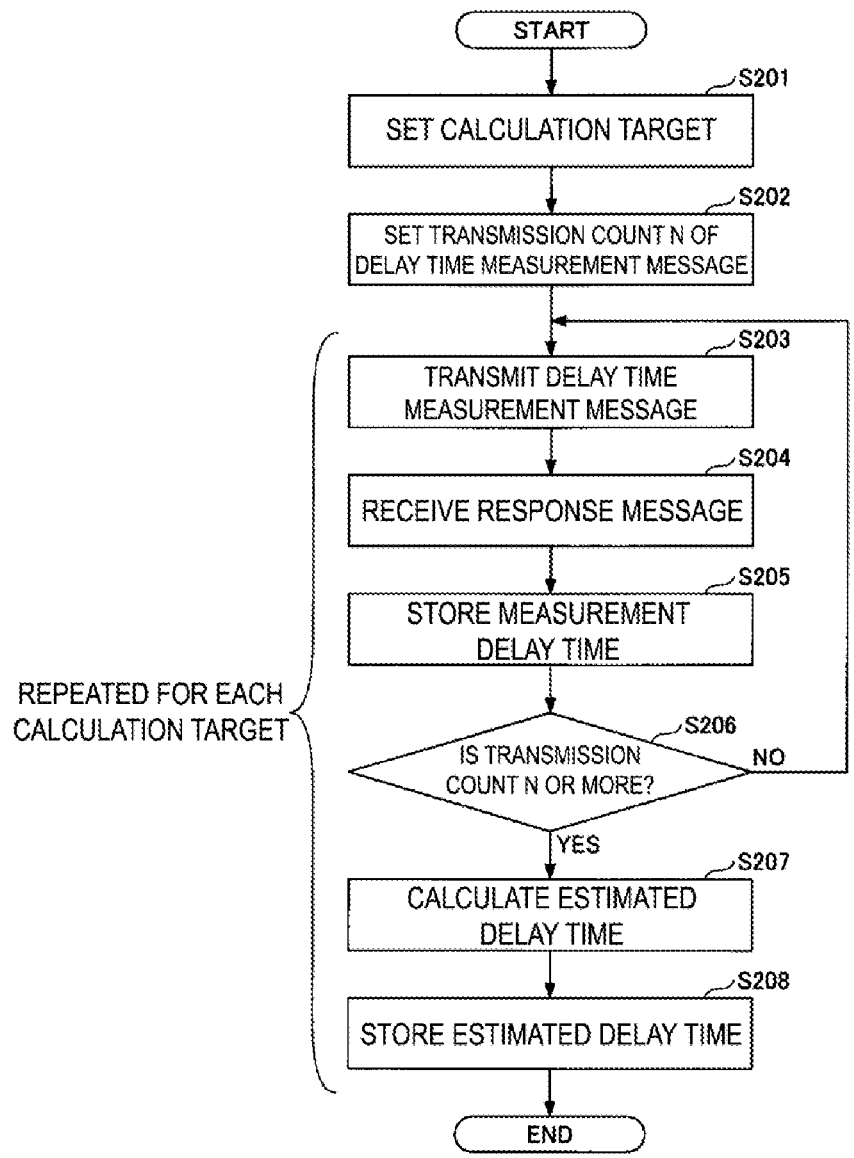
FIG. 6 is a flowchart illustrating an example of delay time estimation processing according to the embodiment of the present invention.

Next, delay time estimation processing according to the embodiment of the present invention will be described with reference to FIG. 6. FIG. 6 is a flowchart illustrating an example of the delay time estimation processing according to the embodiment of the present invention. The delay time estimation processing described below is repeatedly executed, for example, every prescribed predetermined time period, in consideration of variations in the delay time associated with changes in the network environment and the like.

Step S201: The target setting unit 131 of the delay time estimation processing unit 130 sets a device 30 or a set of devices 30 serving as a calculation target of the estimated delay time. Here, in the case where the number of devices 30 is small, each of these devices 30 may serve as a calculation target. In the case where the number of devices 30 is large, these devices 30 may be classified into a plurality of sets in accordance with characteristic information such as the types of the devices 30, and the sets (hereinafter, also referred to as "device sets V") may serve as calculation targets.

More specifically, for example, in a case where the total number of devices 30 is M and each of the devices 30 serves as a calculation target, the target setting unit 131 may set each of the M devices 30 including a device $30_1$, a device $30_2$, ..., and a device $30_1$ to serve as a calculation target. By contrast, in a case where the M devices 30 are classified into C (<M) device sets V in accordance with characteristic information such as, for example, the types of the devices 30, the target setting unit 131 may set each of the C device sets V including a device set $V_1$, a device set $V_2$, ..., a device set $V_C$ to serve as a calculation target.

Step S202: The transmission count setting unit 132 of the delay time estimation processing unit 130 sets the transmission count N of the delay time measurement message. Note that the transmission count N may be a predetermined value or a value designated by the user.

Subsequent steps S203 to S208 are performed repeatedly for each calculation target (i.e. device 30 or device set V). Note that some of the calculation targets set in step S201 above may be selected, and then the subsequent steps S203 to S208 may be executed repeatedly for each of the selected calculation targets.

Step S203: The measurement message communication unit 113 of the communication processing unit 110 transmits a delay time measurement message to the devices 30. In response to this, the device 30 having received the delay time measurement message transmits a response message to the delay time measurement message.

Here, in a case where the device set V is set to serve as a calculation target, the measurement message communication unit 113 transmits the delay time measurement message to one of the devices 30 belonging to the device set V. Note that one such device 30 may be randomly selected from the device set V, or may be selected in accordance with some criteria from the device set V.

Step S204: The measurement message communication unit 113 of the communication processing unit 110 receives the response message to the delay time measurement message described above.

Step S205: The delay time measurement unit 133 of the delay time estimation processing unit 130 measures the measurement delay time using the delay time measurement message and the response message to this delay time measurement message. The delay time measurement unit 133 stores the measurement delay time in the measurement delay time storage unit 150.

Here, for example, the delay time measurement unit 133 uses the transmission time of the delay time measurement message transmitted in step S203 above and the reception time of the response message received in step S204 described above, to determine the difference between the reception time and the transmission time as a measurement delay time. This is the same method as the method for measuring round-trip-time (RTT). However, the method is not limited to this method, and any method may be used as long as the delay time measurement unit 133 can measure the time required by the time providing apparatus 10 to receive the response message to the delay time measurement message after transmitting the delay time measurement message.

Step S206: The delay time measurement unit 133 of the delay time estimation processing unit 130 determines whether the transmission count of the delay time measurement message to the device 30 in step S203 described above is N or more.

In a case where it is determined that the transmission count of the delay time measurement message to the device 30 is less than N in step S206 described above, the delay time estimation processing unit 130 returns to step S203. Thus, the delay time measurement message is transmitted to the device 30 N times.

On the other hand, in a case where it is determined that the transmission count of the delay time measurement message to the device 30 is N or more in step S206 described above, the delay time estimation processing unit 130 proceeds to step S207. Thus, N delay measurement times are stored in the measurement delay time storage unit 150 for each calculation target.

Step S207: The delay time calculation unit 134 of the delay time estimation processing unit 130 calculates the estimated delay time using the N measurement delay times stored in the measurement delay time storage unit 150. In this way, the delay time between the time providing apparatus 10 and the device 30 (a device 30 serving as a calculation target or a device 30 belonging to a device set V serving as a calculation target).

Here, the delay time calculation unit 134 calculates the estimated delay time using any of the following methods (a) to (d), for example. Hereinafter, the N measurement delay times are denoted by $t_1, t_2, \ldots, t_N$, and the estimated delay time is denoted by T.

(a) The average value of the measurement delay times $t_1, t_2, \ldots, t_N$ is taken as the estimated delay time T. In other words, the delay time calculation unit 134 calculates the estimated delay time T using Formula (1) below.

[Math. 1]

$$T = \frac{1}{N}\sum_{i=1}^{N} t_i \quad (1)$$

(b) The median of the measurement delay times $t_1, t_2, \ldots, t_N$ is taken as the estimated delay time T. In other words, the delay time calculation unit 134 calculates the estimated delay time T using Formula (2) below in a case where the measurement delay times $t_1, t_2, \ldots, t_N$ are sorted in the ascending order and then the measurement delay times after being sorted are represented by $t_1, t_2, \ldots, t_N$.

[Math. 2]

$$T = \begin{cases} t_{(N+1)/2} & \text{if } N\text{: odd} \\ \frac{1}{2}(t_{N/2} + t_{N/2+1}) & \text{if } N\text{: even} \end{cases} \quad (2)$$

(c) The delay time calculation unit 134 calculates, using numerical calculation, the estimated delay time T based on an empirical distribution function of the measurement delay times $t_1, t_2, \ldots, t_N$, or analytically calculates the estimated delay time T from an approximation function determined relative to the empirical distribution function. Here, a probability F(T) with which the estimated delay time is T is expressed by Formula (3) below. Note that the probability F(T) corresponding to the estimated delay time T calculated by the delay time calculation unit 134 is designated, for example, by a user. In other words, the delay time calculation unit 134 calculates the estimated delay time T corresponding to the probability F(T) designated by the user or the like, for example, using the numerical analysis or the analysis of the approximation function described above.

[Math. 3]

$$F(T) = \frac{\#(1 \le i \le N \mid ti \le T)}{N} \quad (3)$$

(d) On the assumption that the delay time follows a certain probability distribution, the delay time calculation unit 134 calculates the estimated delay time T using numerical calculation based on a cumulative distribution function. For example, if the delay time is assumed to follow a normal distribution, the probability density function F(T) is represented by Formula (4) below. Note that the probability F(T) corresponding to the estimated delay time T calculated by the delay time calculation unit 134 is designated, for example, by a user or the like. Like in (c), the delay time calculation unit 134 calculates the estimated delay time T corresponding to the probability F(T) designated by the user or the like, for example, using the numerical analysis described above.

[Math. 4]

$$F(T) = 1 + erf\left(\frac{T-\mu}{\sqrt{2\sigma^2}}\right) \quad (4)$$

Here, $\mu$ is the average value of the measurement delay times $t_i$ (i=1, 2, ..., N), $\sigma$ is the standard deviation of the measurement delay times $t_i$ (i=1, 2, ..., N), and erf is an error function.

Step S208: The delay time calculation unit 134 of the delay time estimation processing unit 130 stores the estimated delay time T calculated in step S207 described above in the estimated delay time storage unit 160.

Note that the estimated delay time T is calculated for each calculation target and stored in the estimated delay time storage unit 160. For example, if devices 30 the total number of which is m serve as calculation targets, the estimated delay times $T_1, T_2, \ldots, T_M$ are calculated for each of the devices 30 and stored in the estimated delay time storage unit 160. For another example, if device sets V the number of which is C serve as calculation targets, the estimated delay times $T_1, T_2, \ldots, T_C$ are calculated for each of the device sets V and stored in the estimated delay time storage unit 160.

As described above, the time providing apparatus 10 according to the embodiment of the present invention estimates the delay time between itself and the devices 30. Furthermore, in this process, in a case where the total number M of the devices 30 is large, the time providing apparatus 10 according to the embodiment of the present invention estimates the delay time for each device set into which these devices 30 are classified. Thus, even if the total number of devices 30 is vast, the calculation time associated with the estimation can be reduced with the estimation accuracy of the delay time maintained.

Time Providing Processing

Figure 7:
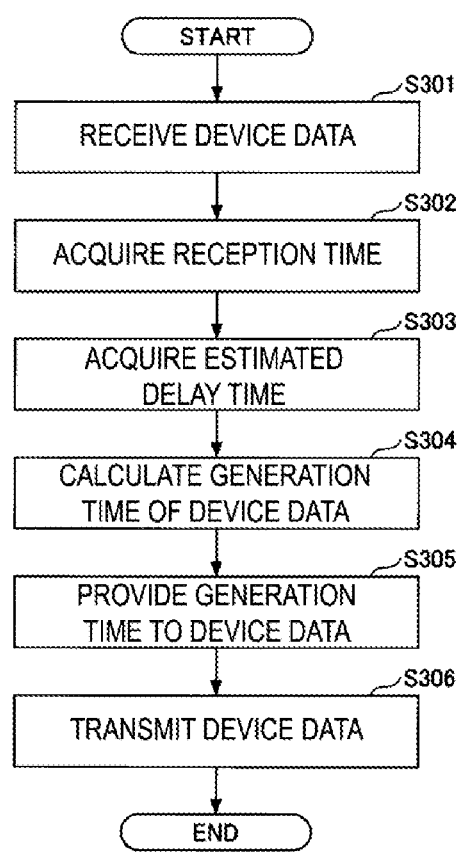
FIG. 7 is a flowchart illustrating an example of time providing processing according to the embodiment of the present invention.

The time providing processing according to the embodiment of the present invention will be described below with reference to FIG. 7. FIG. 7 is a flowchart illustrating an example of the time providing processing according to the embodiment of the present invention. Hereinafter, device data addressed to the data utilization apparatus 40 is assumed to be transmitted from the device 30.

Step S301: The device data communication unit 111 of the communication processing unit 110 receives device data from the device 30.

Step S302: The reception time acquisition unit 141 of the time providing processing unit 140 acquires time information indicating the time at which the device message was received. Note that the time information indicating the time at which the device message was received is acquired from the system clock of the time providing apparatus 10.

Step S303: The estimated delay time acquisition unit 142 of the time providing processing unit 140 acquires the corresponding estimated delay time T among the estimated delay times T stored in the estimated delay time storage unit 160. In other words, the estimated delay time acquisition unit 142 acquires, from the estimated delay time storage unit 160, the estimated delay time T corresponding to the device 30 from which the device data was transmitted or the estimated delay time T corresponding to the device set V to which the device 30 from which the device data was transmitted belongs.

Step S304: The generation time estimation unit 143 of the time providing processing unit 140 calculates the generation time of the device message using the time indicated by the time information acquired in the step S302 described above (reception time of the device message) and the estimated delay time T. In other words, the generation time estimation unit 143 calculates the generation time by subtracting the time, obtained by multiplying the estimated delay time T by ½, from the reception time of the device message. In this manner, the generation time of the device message is estimated.

Step S305: The time providing unit 144 of the time providing processing unit 140 provides time information indicating the generation time to the device message. Here, the time providing unit 144 can provide the time information to a predetermined position in the data structure of the device message. For example, the time providing unit 144 may provide the time information to the internal structure of the application data corresponding to the application layer of the OSI reference model, or may provide the time information to the IP header corresponding to the network layer. In a case where the time information is provided to the IP header, it is conceivable to write the time information, for example, as an Internet timestamp in an optional region of the IP header expansion information.

Note that, for example, in a case where the time information is provided to the internal structure of the application data, the data utilization apparatus 40 needs to retain information for identifying the position in the application data where the time information is provided.

Step S306: The device data communication unit 111 of the communication processing unit 110 transmits (transfers) the device data provided with the time information (time information indicating the generation time) in step S305 described above to the data utilization apparatus 40.

As described above, the time providing apparatus 10 according to the embodiment of the present invention estimates the generation time of the device data using the reception time of the device data and the estimated delay time, and then provides time information indicating the estimated generation time to the device data. Then, the time providing apparatus 10 according to the embodiment of the present invention transmits (transfers) the device data provided with the time information to the data utilization apparatus 40. This allows the data utilization apparatus 40 to synchronize the device data acquired from the plurality of devices 30 in time.

Moreover, in the time providing system 1 according to the embodiment of the present invention, the time providing apparatus 10 installed in a system environment in the communication network 50 the various devices 30 commonly use (e.g., the carrier's system environment) provides the time information to the device data. In this process, the time providing apparatus 10 according to the embodiment of the present invention synchronizes its own time information with the NTP server 20 every predetermined time period, estimates the generation time taking into account different delay times depending on the types of the devices and the like, and provides the time information indicating this estimated generation time to the device data.

This enables the data utilization apparatus 40 in the time providing system 1 according to the embodiment of the present invention to perform time synchronization with high accuracy among pieces of device data. Thus, for example, even in a case where real-time processing is required such as a case of data streaming, the data utilization apparatus 40 can utilize the device data in synchronization at high accuracy.

The present disclosure is not limited to the above-described embodiment specifically disclosed, and various modifications and changes can be made without departing from the scope of the claims.

REFERENCE SIGNS LIST

1 Time providing system
10 Time providing apparatus
20 NTP server
30 Device
40 Data utilization apparatus
50 Communication network
110 Communication processing unit
111 Device data communication unit
112 Time correction message communication unit
113 Measurement message communication unit
120 Time correction processing unit
121 Time information correction unit
130 Delay time estimation processing unit
131 Target setting unit
132 Transmission count setting unit
133 Delay time measurement unit
134 Delay time calculation unit
140 Time providing processing unit
141 Reception time acquisition unit
142 Estimated delay time acquisition unit
143 Generation time estimation unit
144 Time providing unit
150 Measurement delay time storage unit
160 Estimated delay time storage unit

The invention claimed is:

1. A time providing method performed by a computer comprising:
upon receiving data from a device, estimating a generation time of the data using a reception time of the data and a first delay time of the device that is previously estimated;
providing, to the data, information indicating the generation time;

transmitting, to a destination of the data, the data including information indicating the generation time; and transmitting a message for measuring a delay time to the device and estimating, based on the message and a response to the message, the first delay time for a calculation target, wherein the calculation target includes one or more devices that are determined based on a number of the one or more devices, wherein, based on the number of the one or more devices being less than a predetermined number, the calculation target includes the one or more devices, wherein, based on the number of the one or more devices being greater than or equal the predetermined number, the calculation target includes a set of the one or more devices into which the device is classified according to a type thereof, and wherein estimating the generation time comprises estimating the generation time using the reception time of the data and the first delay time estimated in the estimation of the delay time.

2. The time providing method according to claim 1, wherein the estimation of the generation time comprises estimating, as the generation time, a time obtained by subtracting a time, which is obtained by multiplying the first delay time by ½, from the reception time.

3. The time providing method according to claim 1, wherein the estimation of the delay time comprises:

measuring a second delay time of the device using a transmission time of the message and a reception time of the response, and estimating the first delay time from the second delay time.

4. The time providing method according to claim 3, wherein the estimation of the delay time comprises:

transmitting prescribed N messages to the device, measuring N second delay times using transmission times of the N messages and reception times of the respective responses, and estimating the first delay time by performing computation on the N second delay times.

5. The time providing method according to claim 1, further comprising:

synchronizing time information for acquiring a transmission time and a reception time of data or messages with an NTP server every predetermined time period.

6. A time providing apparatus, including one or more computers, comprising:

a generation time estimator implemented in the one or more computers and configured to estimate, upon receiving data from a device, a generation time of the data using a reception time of the data and a first delay time of the device that is previously estimated;

a providing unit implemented in the one or more computers and configured to attach, to the data, information indicating the generation time; and a transmission unit implemented in the one or more computers and configured to transmit, to a destination of the data, the data including the information indicating the generation time, wherein the transmission unit is configured to transmit a message for measuring a delay time to the device and estimate, based on the message and a response to the message, the first delay time for a calculation target, wherein the calculation target includes one or more devices that are determined based on a number of the one or more devices, wherein, based on the number of the one or more devices being less than a predetermined number, the calculation target includes the one or more devices, wherein, based on the number of the one or more devices being greater than or equal the predetermined number, the calculation target includes a set of the one or more devices into which the device is classified according to a type thereof, and wherein estimating the generation time comprises estimating the generation time using the reception time of the data and the first delay time estimated in the estimation of the delay time.

7. A non-transitory computer readable medium which stores a program for causing a computer to execute operations comprising:

upon receiving data from a device, estimating a generation time of the data using a reception time of the data and a first delay time of the device that is previously estimated;

providing, to the data, information indicating the generation time;

transmitting, to a destination of the data, the data including the information indicating the generation time; and transmitting a message for measuring a delay time to the device and estimating, based on the message and a response to the message, the first delay time for a calculation target, wherein the calculation target includes one or more devices that are determined based on a number of the one or more devices, wherein, based on the number of the one or more devices being less than a predetermined number, the calculation target includes the one or more devices, wherein, based on the number of the one or more devices being greater than or equal the predetermined number, the calculation target includes a set of the one or more devices into which the device is classified according to a type thereof, and wherein estimating the generation time comprises estimating the generation time using the reception time of the data and the first delay time estimated in the estimation of the delay time.

8. The non-transitory computer readable medium according to claim 7, wherein the estimation of the generation time comprises estimating, as the generation time, a time obtained by subtracting a time, which is obtained by multiplying the first delay time by ½, from the reception time.

9. The non-transitory computer readable medium according to claim 7, wherein the estimation of the delay time comprises:

measuring a second delay time of the device using a transmission time of the message and a reception time of the response, and estimating the first delay time from the second delay time.

10. The non-transitory computer readable medium according to claim 9, wherein the estimation of the delay time comprises:

transmitting prescribed N messages to the device, measuring N second delay times using transmission times of the N messages and reception times of the respective responses, and estimating the first delay time by performing computation on the N second delay times.

11. The non-transitory computer readable medium according to claim 7, wherein the operations further comprise:

synchronizing time information for acquiring a transmission time and a reception time of data or messages with an NTP server every predetermined time period.

12. The time providing method according to claim 4, wherein performing the computation comprises computing an average of the N second delay times.

13. The time providing method according to claim 4, wherein performing the computation comprises computing a median of the N second delay times.

14. The time providing method according to claim 4, wherein performing the computation comprises computing a numerical calculation value or an approximation value based on an empirical distribution function of the N second delay times.

15. The time providing method according to claim 4, wherein performing the computation comprises computing a numerical calculation value based on a cumulative distribution function of the N second delay times.

16. The non-transitory computer readable medium according to claim 10, wherein performing the computation comprises computing an average of the N second delay times.

17. The non-transitory computer readable medium according to claim 10, wherein performing the computation comprises computing a median of the N second delay times.

18. The non-transitory computer readable medium according to claim 10, wherein performing the computation comprises computing a numerical calculation value or an approximation value based on an empirical distribution function of the N second delay times.

19. The non-transitory computer readable medium according to claim 10, wherein performing the computation comprises computing a numerical calculation value based on a cumulative distribution function of the N second delay times.

* * * * *